UNITED STATES PATENT OFFICE.

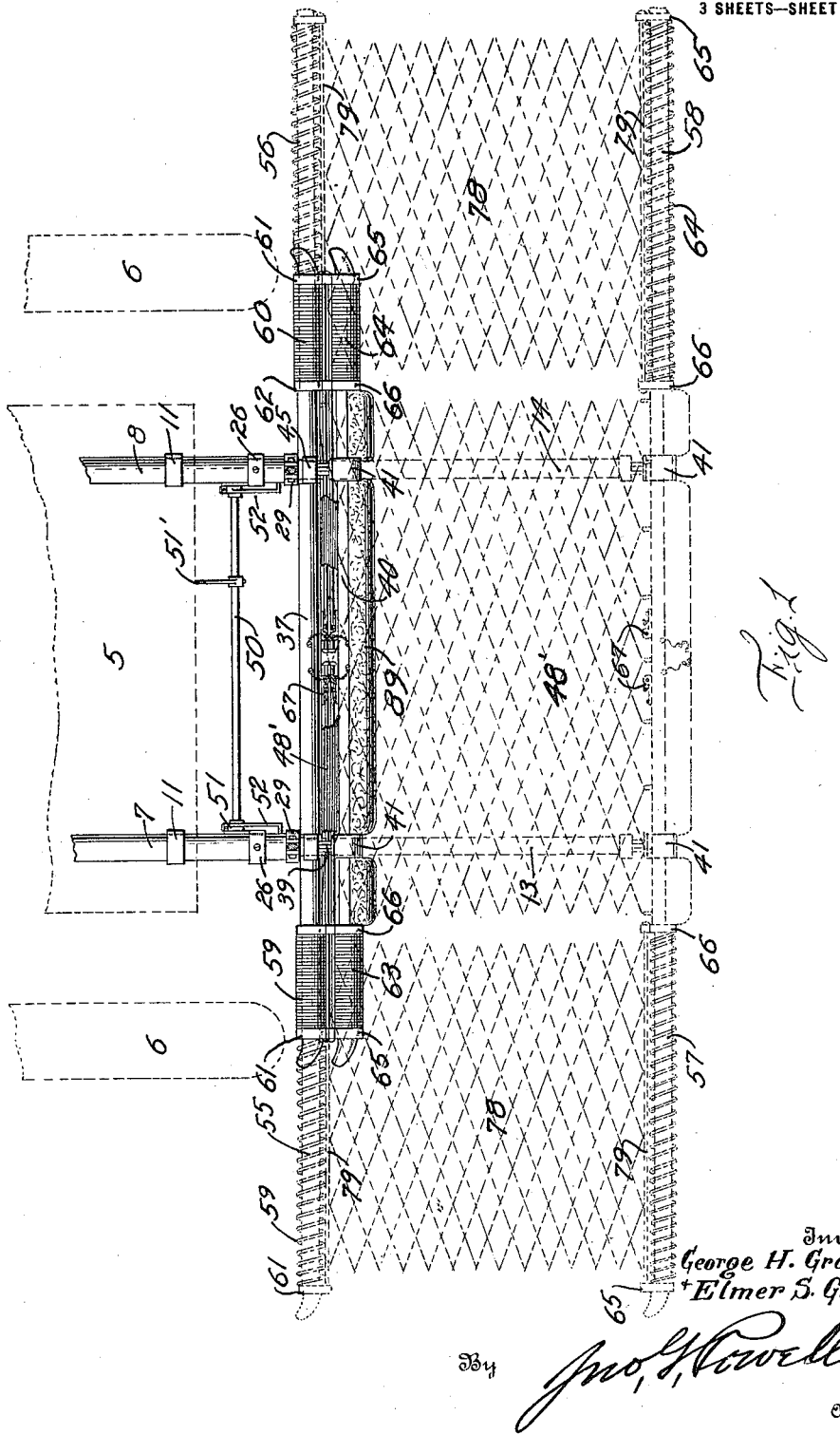

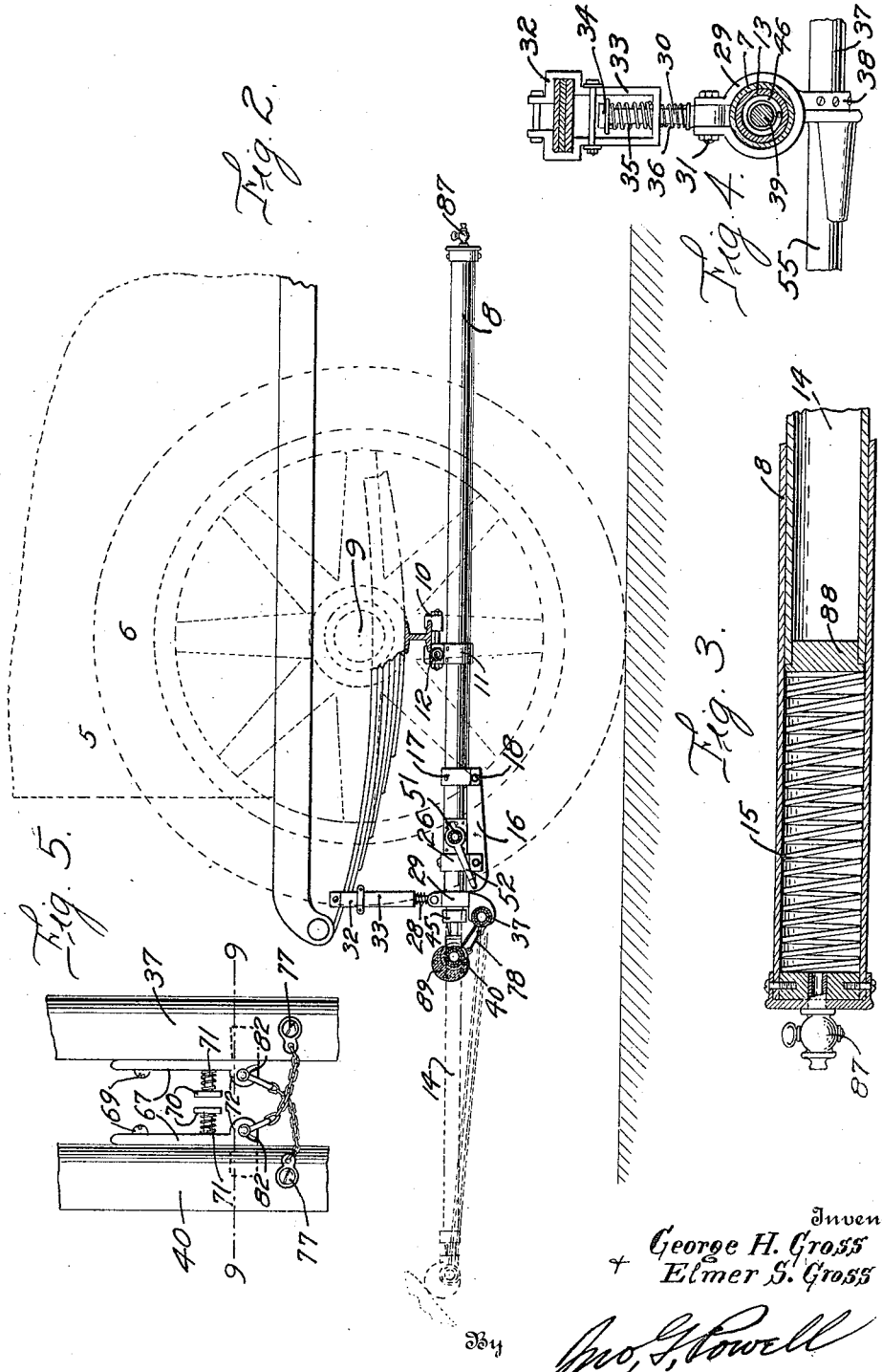

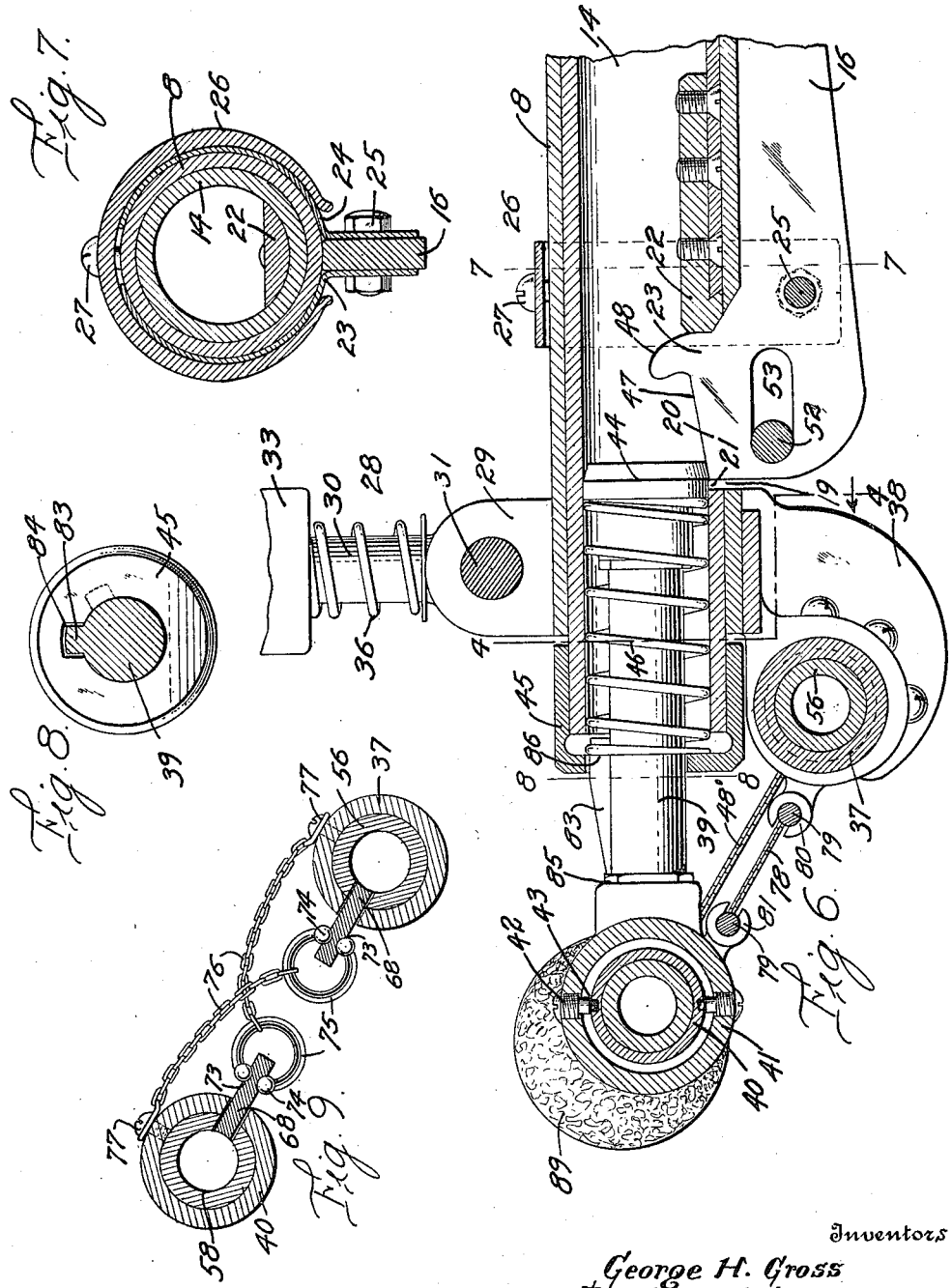

GEORGE H. GROSS, OF DENVER, COLORADO, AND ELMER S. GROSS, OF RACINE, WISCONSIN.

FENDER FOR MOTOR-VEHICLES.

1,322,691.  Specification of Letters Patent.  Patented Nov. 25, 1919.

Application filed November 1, 1918. Serial No. 260,718.

*To all whom it may concern:*

Be it known that we, GEORGE H. GROSS and ELMER S. GROSS, citizens of the United States, and respectively a resident of the city and county of Denver and State of Colorado, and a resident of Racine, in the county of Racine and State of Wisconsin, have invented certain new and useful Improvements in Fenders for Motor-Vehicles, of which the following is a full, clear, and exact description, such as will enable others skilled in the art to which the invention appertains to make and use the same.

Our invention relates to improvements in fenders for motor vehicles, and the invention has for its object the provision of a fender adapted to be attached to the front of the motor vehicle and operable automatically, as well as manually, for extending the fender to an operative position when striking a person, or other object, whereby such person or object will be picked up on the fender.

Another object of the invention is to provide a fender for the front of an automobile, which is normally carried in a collapsed and compact position, and operable either manually or automatically when striking a person to cause the same to be extended to occupy a position so that the same will pick up such person on the fender.

With these and other objects in view the invention will be described now with reference to the accompanying drawings.

Figure 1 is a plan view illustrating the application of the invention to a motor vehicle, and showing the fender diagrammatically in its operable position; Fig. 2 is an elevation view, partially in section, showing the fender applied to a motor vehicle; Fig. 3 is a longitudinal sectional view of one of the telescoping tubes supported by the motor vehicle; Fig. 4 is a cross-sectional view taken on the line 4—4 of Fig. 6; Fig. 5 is a detailed view of means whereby the laterally extendible portions of the fender are held in collapsed condition; Fig. 6 is an enlarged sectional view of the forward extremity of one of the side members of the fender; Fig. 7 is a cross-sectional view taken on the line 7—7 of Fig. 6; Fig. 8 is a cross-sectional view taken on the line 8—8 of Fig. 6; and Fig. 9 is a cross-sectional view taken on the line 9—9 of Fig. 5.

Corresponding and like parts are referred to in the following description and indicated in all the views of the accompanying drawings by same reference characters.

The numeral 5 designates diagrammatically the front part of an automobile, and the numeral 6 designates the front wheels thereof.

Let the small numerals 7 and 8 represent hollow spaced apart fixed side tubes, which are suspended to the front axle 9 of the automobile by means of clamps 10 and collars 11, said collars 11 being pivotally connected with the said clamps 10, as shown at 12. Extension tubes 13 and 14 are respectively received in the hollow tubes 7 and 8, and are adapted to be extended forwardly therefrom by means of spiral springs 15, which are received in the hollow fixed side tubes 7 and 8, and against which the tubes 13 and 14 are seated. When the fender is in its inoperative or collapsed condition, the tubes 13 and 14 are telescoped in the hollow fixed tubes 7 and 8 against the springs 15 and hold the latter under compression. Each of the hollow tubes 7 and 8 is provided with a latch member 16, pivoted at one extremity to a collar 17, as shown at 18, said collars surrounding the hollow fixed tubes 7 and 8. The hollow fixed tubes 7 and 8 are provided with openings 19 therein, through which lugs 20 on the forward extremities of the latches 16 extend. The extension tubes 13 and 14 are also provided with openings 21 adapted to register with the openings 19 in the hollow fixed tubes 7 and 8, when the said extension tubes are telescoped or received in the stationary tubes. The lugs 20 of the latches 16 being received through the openings 19 and 21, will hold the extension tubes 13 and 14 in their telescoped positions. The interior of the extension tubes 13 and 14 are provided with members 22 secured therein, which said members 22 are adapted to engage with shoulders 23 on the lugs 20, thereby holding the extension tubes 13 and 14 in their telescoped positions until they have been released by the disengagement of the lugs 20 from the openings 19 and 21 of the fixed tubes 7 and 8 and the extension tubes 13 and 14. The manner of releasing these lugs 20, whereby the extension tubes 13 and 14 will be extended, will be later more fully explained. Spring arms 23 and 24 engage with and partially encircle the circumference of the fixed tubes 7 and 8, said spring arms being pivotally connected with the latches 16 intermediate the extremities of the latter, as shown at 25. These spring arms 23 and 24 normally retain the latches 16 in their locking positions. A spring clamp 26 is received over the spring arms 23 and 24, and is secured in place by means of a screw 27, said screw 27 entering the fixed tubes 7 and 8 between the inner extremities of the two arms 23 and 24. This spring clamp 26 serves to increase the tension, or resistance of the spring arms 23 and 24.

The forward extremities of the fixed tubes 7 and 8 are suspended from the forward springs of the automobile by means of arms 28, one of which is respectively connected with each of the stationary tubes 7 and 8. These arms are shown in detail in Figs. 4 and 6, and the detailed description of one will be sufficient to make the same understood. 29 represents a collar, one of which is respectively received around the forward extremity of the fixed tubes 7 and 8. The lower extremity of a pin 30 is pivoted in this collar 29 as shown at 31. A clamp 32 is adapted to be secured to the spring of the vehicle, the said clamp 32 having a lower stirrup-shaped portion 33, through which the pin 30 passes. The upper extremity of the pin 30 is provided with a cap 34 thereon and between which cap and the stirrup-shaped portion of the clamp 32, a spiral spring 35 is interposed. The said spiral shaped spring 35 surrounds the pin 30 and supports the weight of the fender thereon. A compensating spring 36 surrounds the pin 30 below the stirrup-shaped portion 33 of the clamp 32.

A transverse stationary hollow bar 37 is supported underneath the forward extremities of the fixed tubes 7 and 8 by means of supporting brackets 38, which said brackets 38 are carried by the arms 28, and are integral with the collars 29.

A plunger 39 is received in the forward extremity of each of the extension tubes 13 and 14, the outer extremities of the two plungers 39 carrying a hollow bumper bar 40, the said hollow bumper bar 40 being received in a collar 41 of each of the plungers 39. The plungers 39 are journaled in these collars 41. Pivot screws 42 pass through these collars 41 and are received into the bumper bar 40, as shown at 43, whereby the bumper bar 40 is pivotally mounted upon the plungers 39. The inner extremity of each of the plungers 39 is provided with a head 44 thereon, which is adapted to actuate the latches 16, as will be later explained. A cap 45 is secured to the outer extremity of each of the extensible tubes 13 and 14, said cap 45 being provided with an opening therein through which the plunger 39 is received. A spiral spring 46 is received in each of the extension tubes 13 and 14, and normally maintains the plungers 39 in a stationary position. This spiral spring 46 is interposed between the cap 45 and the head 44.

The spiral spring 15 received in each of the fixed tubes 7 and 8 engages the inner extremities of the extension tubes 13 and 14, whereby when said tubes 13 and 14 are released by the latches 16, the spiral springs 15 will cause said extension tubes 13 and 14 to move forwardly. The plungers 39 will move inwardly whenever the bumper bar 40 comes into contact with a person or object. This rearward movement of the plungers 39 will cause the heads 44 to move against an inclined surface 47 of the lugs 20, causing the lugs 20 to move downwardly, whereupon the parts 22, will engage with lips 48 and further depress the latches 16 until the lugs 20, as well as the lips 48 have been entirely disengaged from the recesses 21. Thus, in this manner, the extension tubes 13 and 14 have been released and will be caused to move forwardly by the tension of the springs 15, thereby extending the bumper bar 40. The members 22, which are secured on the interior of the extension tubes 13 and 14 will serve as a limit, or stop to the inward movement of the plungers 39.

A metallic or other form of netting, designated 48' connects the transverse stationary bar 37 with the bumper bar 40, such netting 48' being of such form that it will collapse when the extension tubes 13 and 14 are in their telescoped positions.

As a means of manually releasing the latches 16 so as to permit the extension tubes 13 and 14 to be moved to their extended positions, a foot actuated bar 50 is journaled, as shown at 51, in journal sockets carried by the fixed tubes 7 and 8. This bar 50 is adapted to be rotated by means of a foot-pedal 51'. Fingers 52 are carried by the opposite extremities of the bar 50 and engage in slots 53 of the latches 16. By rotating the bar 50 these fingers 52, being eccentric to the bar 50, will actuate the latches 16 and release the latter.

Telescoping bars 55 and 56 are received in the opposite extremities of the stationary bar 37, and when the fender is in its collapsed condition, are adapted to be telescoped in the bar 37, as shown in full lines in Fig. 1. Similar telescoping bars 57 and 58 are received in the opposite extremities of the bumper bar 40, and are adapted to be telescoped in the latter, the same as the bars 55 and 56 are telescoped in the stationary bar 37, when the fender is collapsed. Spiral springs 59 and 60 are respectively mounted upon the telescoping bars 55 and 56 between flanges 61, mounted on the outer extremities of the telescoping bars 55 and 56, and flanges 62 are mounted upon the opposite extremities of the stationary bar 37, against which the spiral springs 59 and 60 engage. Similar spiral springs 63 and 64 are respectively mounted upon the telescoping bars 57 and 58 between flanges 65, which are on the outer extremities of the said telescoping bars 57 and 58 and flanges 66, which are on the opposite extremities of the bumper bar 40, against which the spiral springs 63 and 64 engage. When the fender is collapsed, the telescoping bars 55 and 56 and the telescoping bars 57 and 58 are received respectively in the stationary bar 37 and in the bumper bar 40 against the tension of the spiral springs 59 and 60 and 63 and 64, whereby when said telescoping bars are released, in the manner hereinafter described, the said spiral springs will cause the telescoping bars to be extended laterally. These telescoping bars will be extended simultaneously with the extension, or forward movement of the extension bars 13 and 14, the forward movement of the said extension bars 13 and 14 causing the telescoping bars 55, 56, 57 and 58 to be released, or unlocked so that the tension of the spiral springs 59, 60, 63 and 64 will cause said telescoping bars to be extended laterally. The means for locking the telescoping bars 55, 56, 57 and 58 in their telescoping positions is shown in detail in Figs. 5 and 9. Two spring members 67 are respectively secured to the stationary bar 37 and to the bumper bar 40, each of said spring members carrying a pin 68 at one extremity thereof. These pins 68 pass through openings in the stationary bar 37 and in the bumper bar 40, and enter openings in the telescoping bars 55 and 56 and 57 and 58 thereby holding the said telescoping bars in telescoped positions against the tension of the spiral springs aforesaid. The spring members 67 are secured to the stationary bar 37 and to the bumper bar 40, as shown at 69. Pins 70 pass through the spring members 67, the latter being movable on said pins, and the pins are anchored in the stationary bar 37 and bumper bar 40. Spiral springs 71 surround the pins 70, and act upon the spring members 67 to hold the locking pins 68 in locking position. There are two pairs of the means for locking the telescoping bars, one pair for the telescoping bars 55 and 57 and the other pair for the telescoping bars 56 and 58. See Fig. 1. The spring members 67 of each pair of locking means are provided with ears 72, said ears 72 having recesses 73 on their opposite sides in which are adapted to be received balls 74 of clamp members 75. Chains 76 are secured to the stationary bar 37 and to the bumper bar 40, as shown at 77. The chain secured to the stationary bar 37 is connected with the clamp which engages the ear 72 of the bumper bar 40, and the chain secured to the bumper bar 40 engages the ear 72 of the stationary bar 37. By reason of this chain connection, when the bumper bar 40 is caused to move forwardly away from the stationary bar 37, the spring members 67 will be moved outwardly against the tension of the springs 71 and disengage the locking pins 68 from the recesses in the telescoping bars, whereby the said telescoping bars will be actuated to their extended positions in the manner heretofore described.

A metallic, or other form of netting 78 connects with rods 79, one of which is carried by each of the telescoping bars 55, 56, 57 and 58, the outer extremities of the said rods 79 being fixedly secured to the flanges 61 and 65 respectively. The inner extremities of the said rods 79 are received in segmental channels 80 and 81 respectively formed on the stationary bar 37 and on the bumper bar 40, said channels being below the plane of the netting 48, whereby when the telescoping bars are moved inwardly, the netting 78 will be moved under the netting 48. The rods 79 are movable in the channels 80 and 81, whereby the telescoping bars may be moved to their inoperative positions, or telescoped with the stationary bar 37 and bumper bar 40 and carry the rods 79 along therewith, as well as the netting 78, the latter being secured to the said rods 79. The telescoping bars will be locked in their telescoped positions by means of the locking pins 68 in the manner heretofore described. The clamps 75 are possessed of sufficient tension to hold themselves to the ears 72 until the movement forward of the bumper bar 40 pulling upon the chains 76 has disengaged the locking pins 68. The ears 72 are provided with grooves 82 therein, which lead into the recesses 73, whereby the balls of the clamps 75 may be guided into the recesses 73 when the said clamps are being connected with the said ears.

Now, assuming that the fender has been actuated to its operable position. It may now be collapsed, or placed in its inoperative condition and so carried ready for use at any time. The plungers 39 are each provided with a rib 83 thereon, which when in register with mortises 84 in the caps 45, as shown in Figs. 6 and 8, will prevent the said cap 45 from rotating. The outer extremities of the plungers 39 being fastened in the collars 41, as shown at 85. Now, by rotating these caps 45 to bring the ribs 83 out of resister with the mortises 84 and to cause the shoulders 86 of the said ribs to engage the exterior of the caps 45, the said plungers will be prevented from sliding into the tubes 13 and 14. The springs 46 prevent the caps 45 from rotating. When the plungers 39 are in this locking position, by moving the bumper bar 40 rearwardly, the telescoping side tubes 13 and 14 will be moved rearwardly, or caused to telescope with the fixed hollow tubes 7 and 8 until the openings 21 of the said tubes 13 and 14 have registered with the opening 19 of the fixed tubes 7 and 8, whereupon the lugs 20 of the latches 16 will enter the openings 21 and retain the said tubes in their telescoped condition until again extended by the springs 15 when the latches 16 have been actuated to release said tubes 13 and 14. After the tubes 13 and 14 have thus been telescoped, the caps 45 are turned so that the mortises 84 thereof will register with the ribs 83 of the plungers 39 whereby the plungers 39 will be permitted to move inwardly for automatically actuating the latches 16.

The rear extremities of the fixed tubes 7 and 8 are provided with air cocks 87, which may be regulated to permit a limited quantity of air to enter said tubes, thereby creating a resistance to the sudden extension of the tubes 13 and 14. The inner extremities of the tubes 13 and 14 are provided with caps 88, which form pistons in the fixed tubes and prevent air from rapidly escaping around the same into the fixed tubes 7 and 8.

The bumper bar 40 is cushioned, as shown at 89, whereby injury to a person with whom the bar engages is prevented.

The bumper bar 40 will be gently moved, or extended forwardly and trip the person on to the fender, the latter having been extended to support the person thereon.

In case pressure should be exerted near one end of the bumper bar 40, or more pressure should be exerted on one of the extension tubes 13 or 14, said tube upon which the most pressure is exerted will move inwardly in advance of the other, causing one of the latches 16 to be depressed and rotating the shaft 50, whereupon the other latch 16 is simultaneously depressed, and both extension tubes 13 and 14 permitted to move outwardly. The pivotal connection, as shown at 42 and 43, permits one of the extension tubes to move in advance of the other.

While we have described and illustrated herein a specific form of our invention it is understood we are not limited thereto and that the same may be modified and varied without departing from the spirit of the invention or the scope of the appended claims.

Having thus described our invention what we claim and desire to secure by Letters Patent is:—

1. A fender, comprising a carrier automatically extensible forwardly, and a carrier automatically extensible laterally upon the forwardly extending of the first mentioned carrier a predetermined distance.

2. A fender for motor vehicles, comprising fixed tubes, extension tubes adapted to telescope in said fixed tubes when the fender is in its inoperative position, releasable means for extending said extension tubes, a stationary bar at right angles to said fixed tubes, a bumper bar pivotally carried by said extension tubes, and a carrier supported by the said stationary bar and the said bumper bar.

3. A fender for vehicles, comprising fixed hollow tubes disposed in a longitudinal direction with the vehicle, extension tubes adapted to telescope in said fixed tubes when the fender is in its inoperative condition and adapted to be extended from said fixed tubes when the fender is in its operative condition, a carrier part supported by said extension tubes, and carriers adapted to be extended in a lateral direction simultaneously with the extension of the said extension tubes.

4. A fender for vehicles, comprising fixed hollow tubes supported upon the vehicle in spaced apart relation and parallel with the vehicle, extension tubes adapted to telescope in said fixed hollow tubes when the fender is in its inoperative condition and to be extended from the latter when the fender is in its operative condition, a carrier part supported by said extension tubes, other tubes adapted to be extended in a direction at right angles to said extension tubes, and carrier parts supported by said other tubes.

5. A fender for vehicles, comprising fixed hollow tubes supported upon the vehicle in spaced apart relation, extension tubes adapted to telescope in said fixed hollow tubes when the fender is in inoperative condition, springs in said fixed hollow tubes adapted to extend said extension tubes, means for releasing said extension tubes to permit said springs to extend the same, and a carrier netting carried by said extension tubes, said extension tubes being at all times connected with said fixed tubes.

6. A fender for vehicles, comprising fixed hollow tubes horizontally fulcrumed on the vehicle, extension members adapted to telescope in said fixed hollow tubes when the fender is in inoperative condition, means for locking said extension tubes in their telescoping condition, means operable to release said locking means, means for actuating said extension members to their extended position when said locking means is released, a bumper bar carried by said extension members, a stationary bar carried by the vehicle, and a carrier netting adapted to be collapsed supported by said bumper bar and said stationary bar.

7. A fender, comprising a forwardly extensible carrier, a laterally extensible carrier, and spring means for automatically extending the carriers simultaneously upon the movement of the fender.

8. A fender, comprising a forwardly extensible carrier, a laterally extensible carrier, spring means normally urging the carriers to extended positions, and means operable automatically upon being struck by a person's body to release said spring means and substantially simultaneously extend said forwardly and laterally extensible carriers.

9. A fender, comprising, a forwardly extensible carrier, a laterally extensible carrier, and means operable automatically upon being struck by a person's body, to extend the forwardly extensible carrier, and means operable by the movement of said forwardly extensible carrier to extended position to extend the laterally extensible carrier.

10. A fender for vehicles, comprising a forwardly extensible carrier part and a laterally extensible carrier part normally collapsed and adapted to be extended to operative positions, said inwardly extensible carrier part comprising in part two hollow members and disposed longitudinally with respect to the vehicle, telescoping members adapted to telescope in said hollow members and adapted to be extended, a pair of hollow members disposed at right angles to the vehicle, one of said hollow members being fixed to said telescoping members and the other being connected with said hollow members, and carriers carried by said rectangular hollow members, said laterally extensible carrier part comprising in part two telescoping members adapted to telescope in said hollow members disposed at right angles to the vehicle at the opposite extremities thereto, carriers supported by said telescoping members, means for locking said telescoping members in their telescoping condition, means for unlocking said telescoping members upon the movement of the telescoping members disposed longitudinally with respect to the vehicle, and means for extending said telescoping members when the latter are unlocked.

11. A fender comprising a forwardly extensible carrier, a laterally extensible carrier, means operable automatically upon being struck by a body to extend the carriers, and means independent of said automatic operable means for manually extending the carriers.

In testimony whereof we affix our signatures.

GEORGE H. GROSS.
ELMER S. GROSS.